J. B. Quigley.
Tapping Mains.
N° 25,216. Patented Aug. 23, 1859.
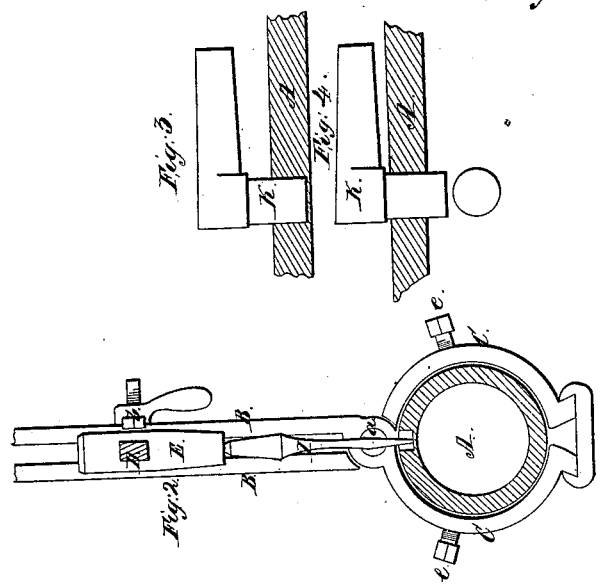
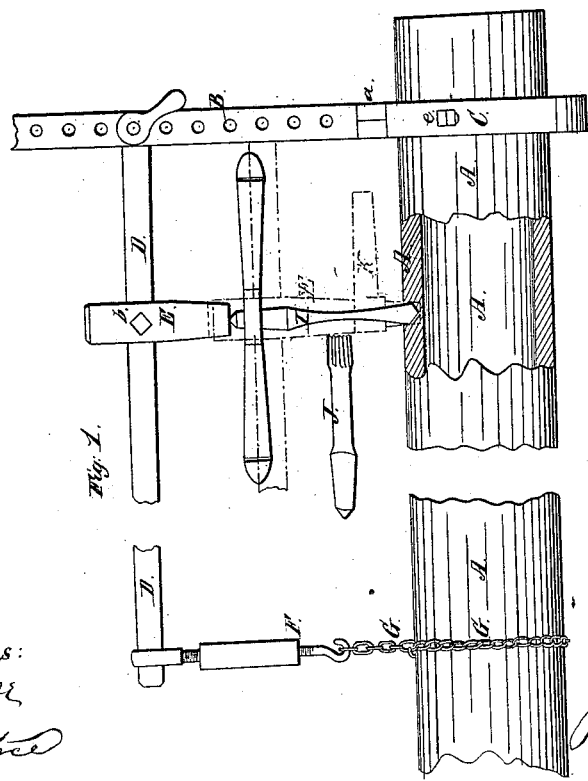
Witnesses:
Inventor:
John B. Quigley

UNITED STATES PATENT OFFICE.

JOHN B. QUIGLEY, OF TRENTON, NEW JERSEY.

TAPPING WATER-MAINS.

Specification of Letters Patent No. 25,216, dated August 23, 1859.

*To all whom it may concern:*

Be it known that I, JOHN B. QUIGLEY, of Trenton, in the county of Mercer and State of New Jersey, have invented a new and Improved Mode of Tapping Water-Mains; and I do hereby declare that the following is a full, clear, and exact description of the same, reference being had to the accompanying drawings, making part of this specification, in which—

Figure 1, represents a section of pipe with my apparatus attached to it, showing the operation of inserting the ferrule. Fig. 2, shows an end view of the same. Fig. 3, shows the ferrule inserted in the hole formed by the drills. Fig. 4, shows the ferrule finally inserted into the pipe.

A, represents the main pipe and B, a pair of standards pivoted together at *a*, which standards have two semi-circular jaws C, C, which are clamped to the main at any desired point convenient for tapping, the standards proceeding perpendicularly from the surface of the pipe. These standards support one end of an adjustable beam D, which is provided with a vertical sliding piece E, having a set screw *b*, for fixing it to the beam D, at any required point directly over the spot in the pipe to be tapped. To the extreme end of the beam D, an adjustable swivel hook F is attached, which hook serves, in connection with the chain G, encompassing the pipe, to secure the beam rigidly in place during the operation of drilling, so as to steady the drill. This arrangement with the two drills I, J, and ferrule K, constitute the essential parts required in the operation, which is as follows:

The standards are clamped rigidly to the pipe by set screws *e*, *e*, and the beam D, and slide piece E, properly adjusted. The ordinary double-cutting drill I, is placed under the piece E, as is shown by Fig. 1. A pressure is then put upon the end of the beam and a hole drilled nearly through the pipe. This drill is then withdrawn, and a "reamer" J, is introduced, which reamer is made to bore out a smooth hole. This second drill is used until only a thin shell of the pipe is left, so thin, in fact, as to give way under a slight blow. When the hole is so far bored out, it is ready for the introduction of the ferrule, which is previously attached in the usual way to a service pipe; the ferrule is then introduced and the piece E, is placed upon its head as indicated by the red lines of Fig. 1, and held thereon by a pressure upon the end of the beam D, and by one or two slight blows it is driven through the pipe, as shown in Fig. 4, when the attachment is completed.

What I claim as my invention and desire to secure by Letters Patent is:—

The employment of the pivoted standards B, jaws C, adjustable beam D, adjustable swivel F, chain G, vertical sliding piece E, and ferrule K, when the above parts are arranged and combined as herein shown and described.

JOHN B. QUIGLEY.

Witnesses:
CHAS. G. MOORE,
WM. W. C. FORCE.